United States Patent
Tsai

(10) Patent No.: US 9,001,237 B2
(45) Date of Patent: Apr. 7, 2015

(54) METHOD FOR PROCESSING IMAGE DATA

(71) Applicant: Genesys Logic, Inc., New Taipei (TW)

(72) Inventor: Wen-fu Tsai, Taipei (TW)

(73) Assignee: Genesys Logic, Inc., New Taipei (TW)

( * ) Notice: Subject to any disclaimer, the term of this patent is extended or adjusted under 35 U.S.C. 154(b) by 0 days.

(21) Appl. No.: 14/045,470

(22) Filed: Oct. 3, 2013

(65) Prior Publication Data

US 2014/0098260 A1   Apr. 10, 2014

(30) Foreign Application Priority Data

Oct. 5, 2012 (TW) .............................. 101136913 A

(51) Int. Cl.
- *H04N 5/76* (2006.01)
- *G06F 13/00* (2006.01)
- *G09G 5/399* (2006.01)
- *H04N 9/79* (2006.01)
- *H04N 5/225* (2006.01)

(52) U.S. Cl.
CPC . *H04N 9/79* (2013.01); *H04N 5/225* (2013.01)

(58) Field of Classification Search
CPC .......... G09G 5/006; G09G 2300/0857; H04N 5/232; H04N 5/23293; H04N 5/335; H04N 5/3742; H04N 19/00484; H04N 5/76
USPC ................... 348/231.1–231.99; 345/530–574
See application file for complete search history.

(56) References Cited

U.S. PATENT DOCUMENTS

| 5,386,538 A | | 1/1995 | Nye |
|---|---|---|---|
| 5,848,024 A | * | 12/1998 | Cho .......................... 365/230.06 |
| 5,864,505 A | * | 1/1999 | Higuchi .................... 365/189.04 |
| 6,018,478 A | * | 1/2000 | Higuchi .................... 365/189.14 |
| 6,430,098 B1 | * | 8/2002 | Afghahi et al. ................ 365/203 |
| 7,242,370 B2 | * | 7/2007 | Ouchi et al. ..................... 345/1.3 |
| 7,688,361 B2 | | 3/2010 | Tsumura et al. |
| 8,350,791 B2 | * | 1/2013 | Takahashi et al. .............. 345/87 |
| 8,520,056 B2 | | 8/2013 | Sasaki et al. |
| 8,526,493 B2 | * | 9/2013 | Kim et al. ................ 375/240.02 |
| 2001/0020941 A1 | * | 9/2001 | Reynolds ...................... 345/422 |
| 2001/0032297 A1 | | 10/2001 | Morikawa |
| 2002/0196260 A1 | * | 12/2002 | Candler et al. ................ 345/531 |
| 2004/0046772 A1 | * | 3/2004 | Ouchi et al. .................. 345/690 |
| 2008/0068471 A1 | * | 3/2008 | Kondo et al. ............ 348/231.99 |

(Continued)

FOREIGN PATENT DOCUMENTS

| CN | 1320821 | 6/2007 |
|---|---|---|
| CN | 101877210 A | 11/2010 |

(Continued)

*Primary Examiner* — Chia-Wei A Chen
(74) *Attorney, Agent, or Firm* — Lowe Hauptman & Ham, LLP

(57) ABSTRACT

A method for processing image data is described. The method includes the steps: (a) fully writing image data into first buffer area; (b) vertically reading the image data in first buffer area and horizontally writing image data into second buffer area; (c) while completely reading a first portion of first buffer area, allocating the complete read first portion of first buffer area to second buffer area to be served as a writing section; (d) vertically reading the image data in a second portion of first buffer area and writing the image data into second buffer area; and (e) vertically reading the image data of second buffer area and horizontally writing the image data into first buffer area, and after completely reading a portion of second buffer area, allocating the read portion of second buffer area to first buffer area.

11 Claims, 7 Drawing Sheets

(56) References Cited

U.S. PATENT DOCUMENTS

| | | | |
|---|---|---|---|
| 2008/0129841 A1* | 6/2008 | Dosluoglu et al. | 348/231.99 |
| 2008/0165268 A1* | 7/2008 | Takahashi et al. | 348/333.01 |
| 2008/0226176 A1* | 9/2008 | Teng et al. | 382/193 |
| 2008/0284876 A1* | 11/2008 | Makino | 348/231.99 |
| 2009/0122160 A1* | 5/2009 | Kirsch | 348/231.99 |
| 2010/0039560 A1* | 2/2010 | Han | 348/575 |
| 2010/0260428 A1* | 10/2010 | Ueno et al. | 382/232 |
| 2011/0145777 A1* | 6/2011 | Iyer et al. | 716/132 |
| 2012/0026363 A1* | 2/2012 | Fujimura | 348/231.99 |
| 2012/0075320 A1* | 3/2012 | Handschy et al. | 345/559 |
| 2012/0169751 A1* | 7/2012 | Yamamoto et al. | 345/531 |
| 2012/0169753 A1* | 7/2012 | Murakami et al. | 345/560 |
| 2012/0176393 A1* | 7/2012 | Ohkawa et al. | 345/560 |
| 2012/0249565 A1* | 10/2012 | Ishii et al. | 345/531 |
| 2012/0314758 A1* | 12/2012 | Zhang et al. | 375/240.01 |
| 2012/0328192 A1 | 12/2012 | Fukuhara | |

FOREIGN PATENT DOCUMENTS

| | | |
|---|---|---|
| TW | 201134193 A | 10/2011 |
| TW | 201206153 A | 2/2012 |

\* cited by examiner

METHOD FOR PROCESSING IMAGE DATA

CROSS REFERENCE TO RELATED APPLICATION

This application claims the priority of Taiwan Patent Application No. 101136913, filed on Oct. 5, 2012.

FIELD OF THE INVENTION

The present invention relates to a data processing method, and more particularly to a method for processing the image data.

BACKGROUND OF THE INVENTION

Conventionally, the image sensor used in the digital still camera or the camera of cellular phone employs the Charge Coupled Device (abbreviated as CCD) or Complementary Metal-Oxide Semiconductor (abbreviated as CMOS). The output data of the image sensor is the image data with the line-based manner. However, if the image format of Joint Photographic Experts Group (abbreviated as JPEG) is served as image data compression and the data compression of JPEG is operated by the block-based manner, e.g. a scanning block of 8*8 pixels for compressing the image data. Therefore, it is required to perform an additional processing step to allocate the image data between the step of output data of the image sensor and the step of data compression of JPEG.

FIG. 1 is a schematic block diagram of a conventional image data processing device 100. The image data processing device 100 includes a writing controller 102a, a reading controller 102b and a buffer 104 having a first buffer area 104a and a second buffer area 104b. The capacity of the first buffer area 104a is equal to that of the second buffer area 104b wherein the first buffer area 104a and the second buffer area 104b have eight lines respectively which require the capacity of sixteen line buffers. The writing controller 102a receives the image data from the image sensor (not shown) and the image data includes the data structure "H*V" pixels wherein "V" indicates the column amount and "H" indicates the pixels in each column of column amount "V". The image data are written into the first buffer area 104a of the buffer 104 from left line to right line and from top portion to bottom portion. When the first buffer area 104a is fully written, the writing step is witched from the first buffer area 104a to the second buffer area 104b. Further, while the reading controller 102b reads the image data from the first buffer 104a and outputs the image data to the JPEG encoder 106, the reading unit is defined as the block having the "8*8" bytes and the image data stored in the first buffer area 104a are read the from left line to the right line and from top portion to bottom portion for transmitting the reading image data to the JPEG encoder 106 to be compressed. When the second buffer area 104b is fully written, the status of the second buffer area 104b is changed from the writing status to the reading status so that reading controller 102b controls the reading procedure of the second buffer area 104b. When the first buffer area 104a is fully read, the status of the first buffer area 104a is changed from the reading status to the writing status so that the writing controller 102a controls the writing procedure of the first buffer area 104a.

Based on the above-mentioned descriptions, the image data processing device 100 utilizes many buffers 104. Consequently, there is a need to develop a novel image data processing method to solve the aforementioned problems.

SUMMARY OF THE INVENTION

One objective of the present invention provides a method for processing the image data by dividing the buffer into a first buffer area and a second buffer area for allocating a read portion of first buffer area into the second buffer area and follows the second buffer area to be served as a writing section in order to save the buffer processing capacity of the image data.

Another objective of the present invention provides a method for processing the image data by dividing the buffer into a first buffer area and a second buffer area so that the reading step of the image data in the first buffer area and the writing step of the image data into the second buffer area can be performed synchronously when the reading speed of the buffer is greater than or equal to the writing speed of the buffer.

According to the above objectives, the present invention sets forth a method for processing the image data, the method comprises the steps of:

(a) horizontally writing the image data into the first buffer area by the writing controller until the first buffer area is fully written;

(b) vertically reading the image data stored in the first buffer area by the reading controller and synchronously and horizontally writing the image data into the second buffer area by the writing controller;

(c) while completely reading a first portion of the first buffer area by the reading controller, allocating the complete read first portion of first buffer area to second buffer area to be served as a writing section by the state controller;

(d) vertically reading the image data in a second portion of the first buffer area by the reading controller and writing the image data into the second buffer area by the writing controller;

(e) while the state controller determines that the writing controller completely writes the second buffer area, vertically reading the image data of second buffer area by the reading controller and horizontally writing the image data into first buffer area by the writing controller, and after completely reading a portion of second buffer area by the reading controller, allocating the read portion of the second buffer area to the first buffer area to be served as a writing section by the state controller; and (f) repeating the steps of (a) through (e) to complete the access of image data.

The present invention provides the method for processing the image data by dividing the buffer into a first buffer area and a second buffer area for allocating a read portion of first buffer area to the second buffer area to be served as a writing section in order to save the buffer processing capacity of the image data. Further, the method for processing the image data by dividing the buffer into a first buffer area and a second buffer area so that the reading step of the image data in the first buffer area and the writing step of the image data into the second buffer area can be performed synchronously when the reading speed of the buffer is greater than or equal to the writing speed of the buffer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
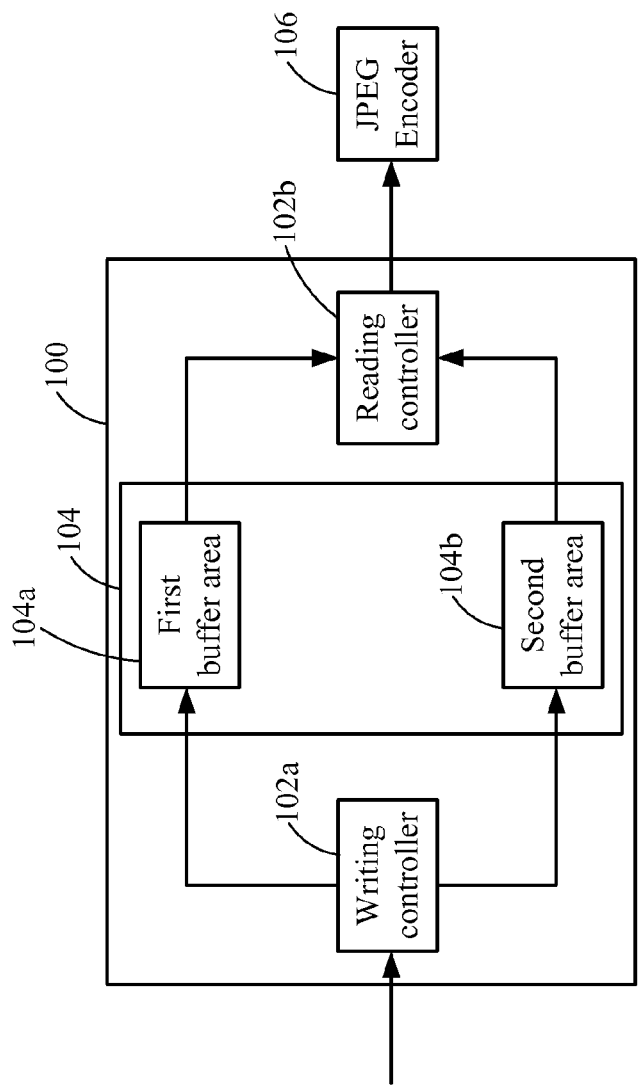
FIG. 1 is a schematic block diagram of a conventional image data processing device.
Figure 2:
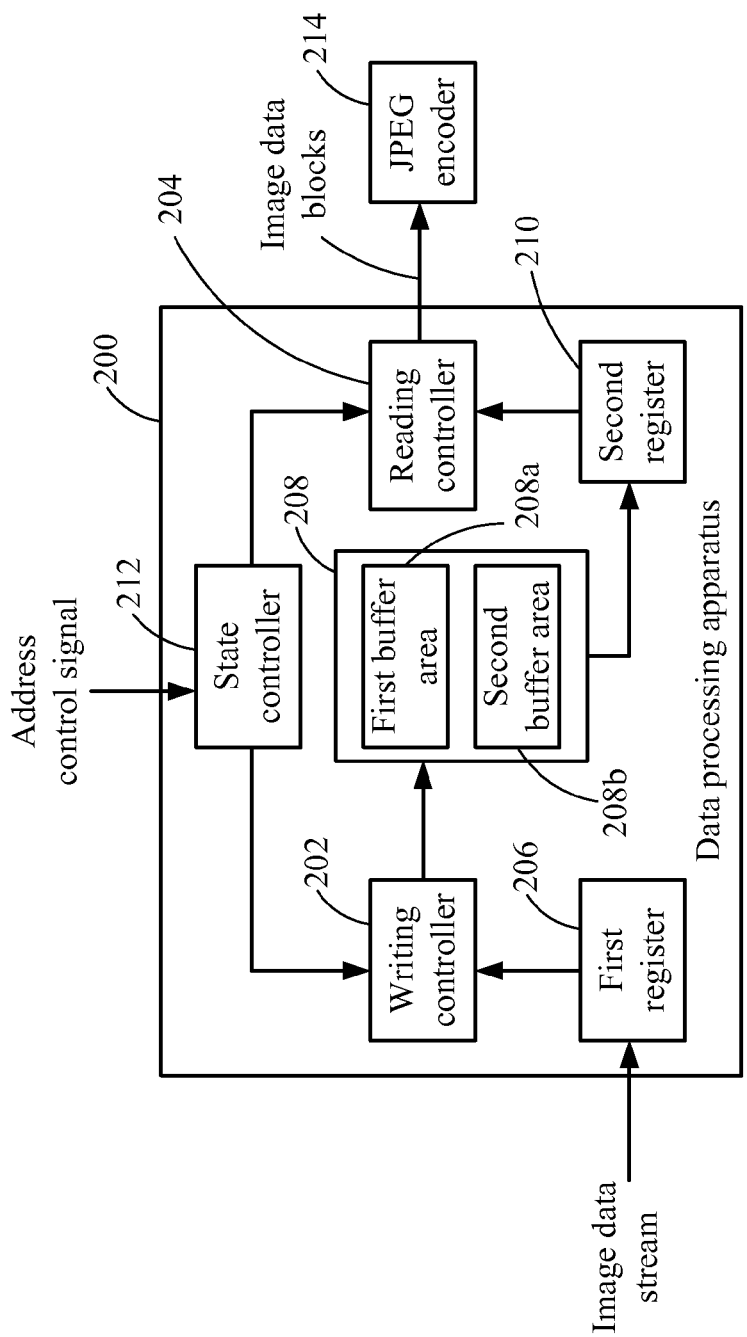
FIG. 2 is a schematic block diagram of an image data processing device according to one embodiment of the present invention.

FIG. 2 is a schematic block diagram of an image data processing apparatus 200 according to one embodiment of the present invention. The image data processing apparatus 200 includes a writing controller 202, a reading controller 204, a first register 206, a buffer 208, a second register 210 and a state controller 212. The buffer 208 includes a first buffer area 208a and a second buffer area 208b. The writing controller 202 is coupled to the first register 206 and the buffer 208. The state controller 212 is coupled to the writing controller and the reading controller 204. The buffer 208 is coupled to the second register 210 and the second register 210 is coupled to the reading controller 204.

The writing controller 202 controls the image data (e.g. image data stream) to be written into the buffer 208 and, for example, the image data is continuously transmitted from the image sensor to the image data processing apparatus 200. The reading controller 204 controls the image data in the buffer 208 to be read. The reading controller may be a multiplexer and the state controller 212. The state controller 212 determine that the writing controller 202 and the reading controller 204 write and read the first buffer area 208a and the second buffer area 208b correspondingly until the image data are outputted from the image data processing apparatus 200. In other words, buffer 208 is a physical memory element wherein the first buffer area 208a and the second buffer area 208b are defined as memory blocks in the buffer 208 corresponding to different physical address section.

Specifically, the reading controller 204 vertically reads the image data in the first buffer area 208a and the writing controller 202 synchronously and horizontally writes the image data into the second buffer area 208b. While the reading controller 204 completely reads a first portion of the first buffer area 208a, the state controller 212 allocates the first portion of the first buffer area 208a to the second buffer area 208b to be served as a writing section. The reading controller 204 vertically reads a second portion of the first buffer area 208a and the writing controller 202 continuously writes the image data into the second buffer area 208b including the portion of the allocated first buffer area 208a.

In the present invention, the horizontal writing procedure means that the image data are sequentially written based on the addresses in each of the rows of the buffer area and the vertical reading procedure means that the image data are sequentially read based on an address in each of the columns of the buffer area.

Figure 3:
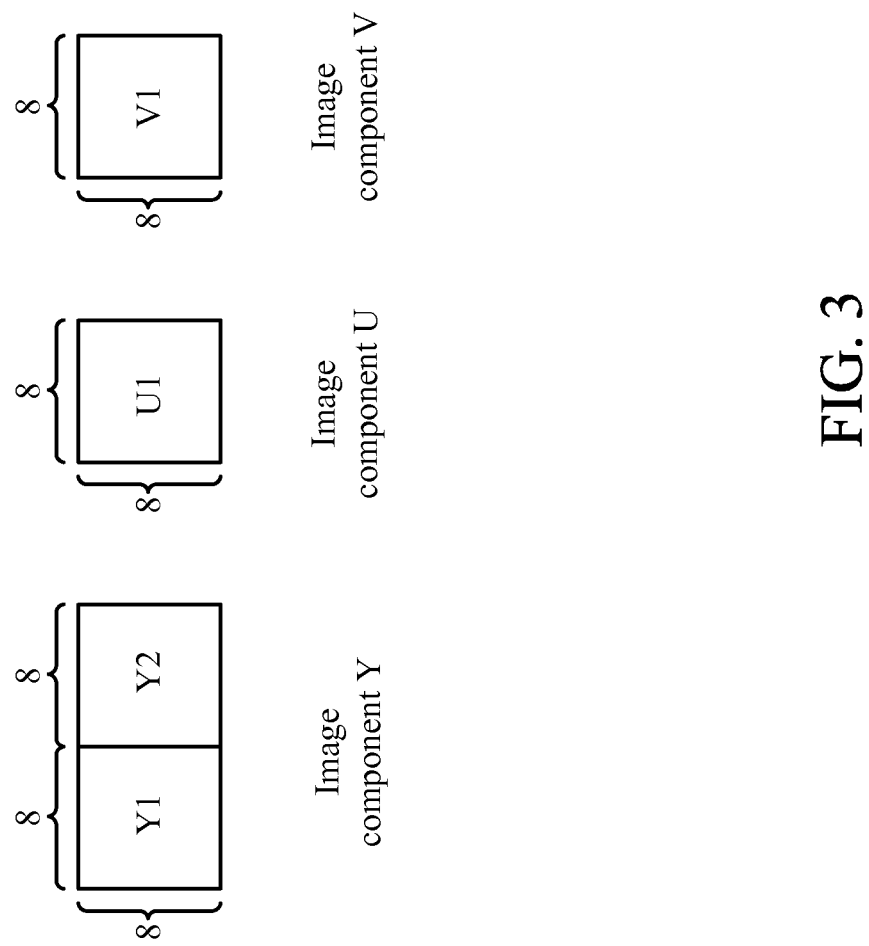
FIG. 3 is a schematic definition view of YUV422 compression format according to one embodiment of the present invention.

FIG. 3 is a schematic definition view of YUV422 compression format according to one embodiment of the present invention. After the image data processing apparatus 200 receives the image data stream, the image data stream is arranged as image blocks which are selected from one group consisting of YUV420, YUV422 and YUV444 compression formats. As shown in FIG. 3, for an example of YUV422 compression format, each of the image blocks in the image data includes "16*8" pixels wherein each of the two image components Y includes "8*8" pixels, one image component U includes "8*8" pixels, and one image component V includes "8*8" pixels. In one embodiment, the image component Y represents the luminance of a pixel, the image component U represents the chrominance of the pixel and the image component V represents the chroma of the pixel wherein each of the pixels is composed of two bytes.

Figure 4A:
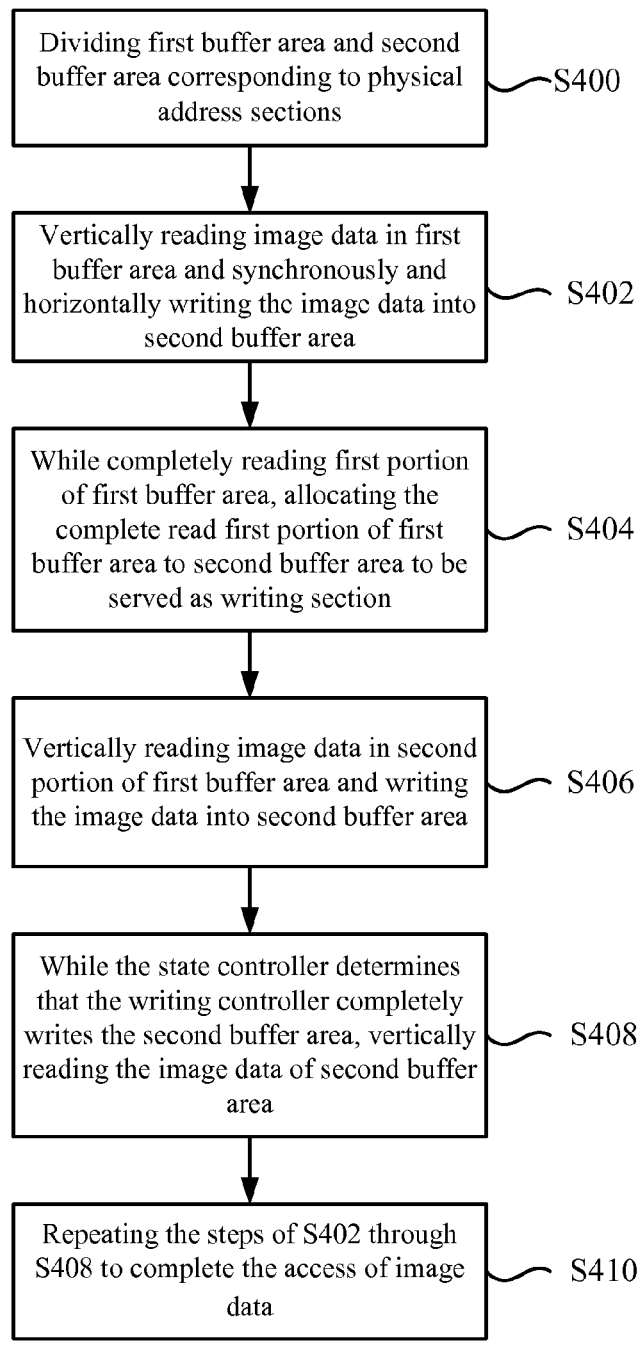
FIGS. 4A-4B are a flow charts of an image data processing method according to one embodiment of the present invention.
Figure 4B:
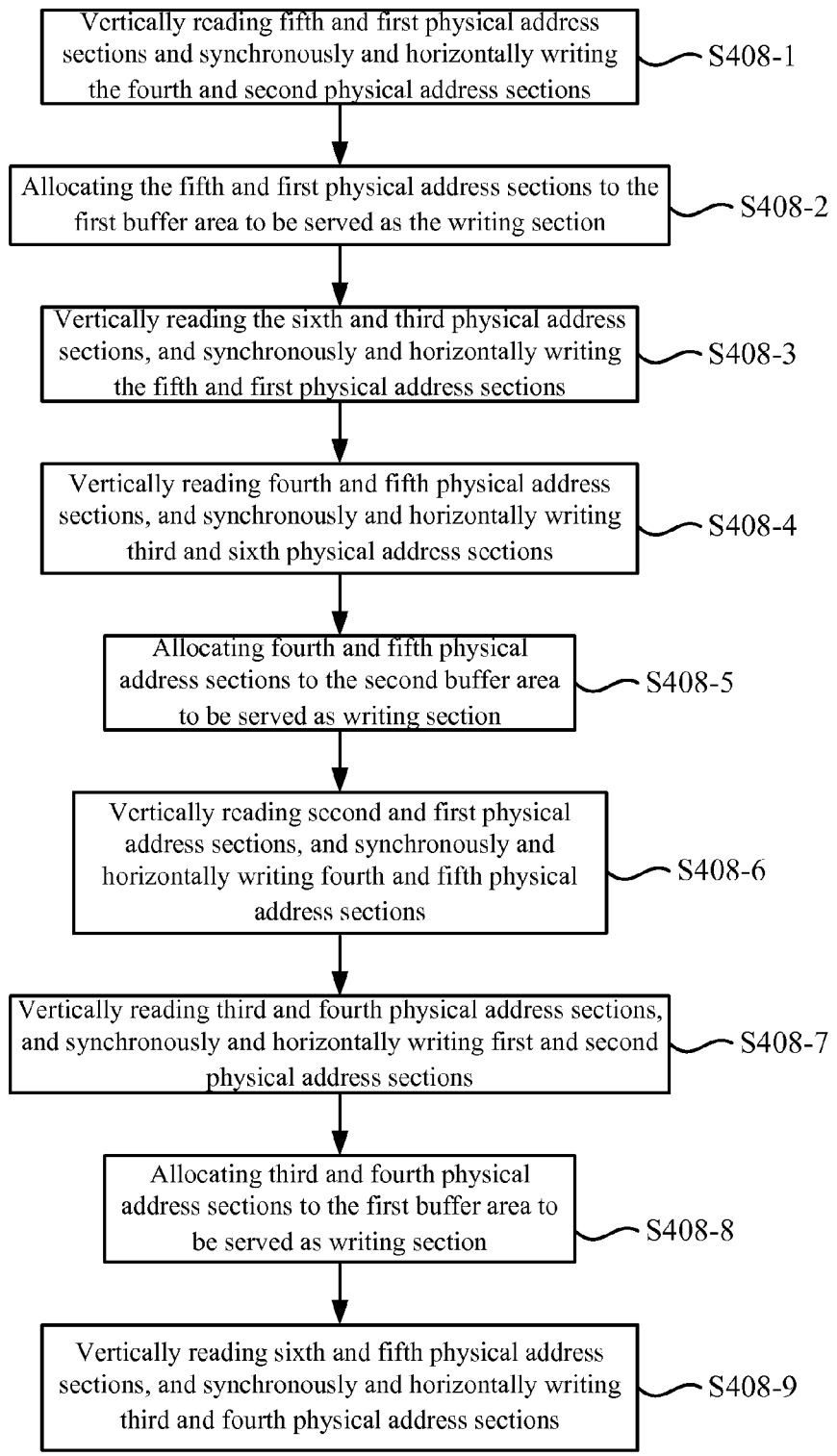
Figure 5:
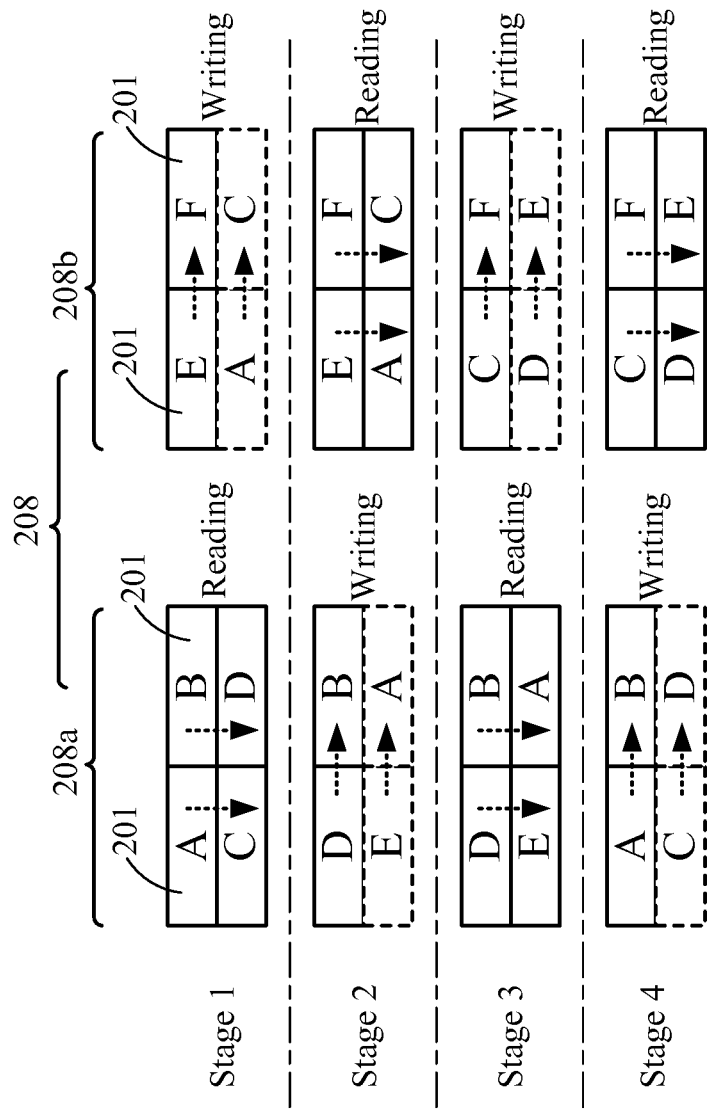
FIG. 5 is a schematic view of writing status changes and reading status changes of the buffer according to one embodiment of the present invention.

Please refer to FIG. 2, FIGS. 4A-4B and FIG. 5. FIGS. 4A-4B are a flow charts of an image data processing method according to one embodiment of the present invention. FIG. 5 is a schematic view of writing status changes and reading status changes of the buffer 208 according to one embodiment of the present invention. The reading status changes in FIG. 5 include four stages. The method for processing image data adapted to an image data processing apparatus 200 including a writing controller 202, a reading controller 204, a buffer 208 and a state controller 212 wherein the buffer 208 has a first buffer area 208a and a second buffer area 208b comprises the following steps.

In the step S400, the buffer 208 of the image data processing apparatus 200 includes a plurality of physical address sections and the buffer 208 is divided into a first buffer area 208a and a second buffer area 208b corresponding to the physical address sections. In one embodiment of stage 1 in FIG. 5, the image data processing apparatus 200 allocates the first buffer area 208a to generate a first physical address section "A", a second physical address section "B", a third physical address section "C" and a fourth physical address section "D" which form a matrix arrangement on the basis of an address order. The image data processing apparatus 200 allocates the second buffer area 208b to generate a fifth physical address section "E" and a sixth physical address section "F" which form a horizontal arrangement on the basis of the address order. The first portion of the first buffer area 208a comprises the first physical address section "A" and the third physical address section "C", and the second portion of the first buffer area 208a comprises the second physical address section "B" and the fourth physical address section "D". In one embodiment, each of the capacities of the first through sixth physical address sections ("A" through "F") is equal. For example, the capacity of the first buffer area 208a is "2560*8" bytes, i.e. the amount of eight line buffers, and the capacity of the second buffer area 208b is "2560*4" bytes, i.e. the amount of four line buffers. Then, the writing controller 202 horizontally writes the image data to the first buffer area 208a until the first through fourth physical address sections ("A" through "D") of the first buffer area 208a is fully written.

In the step S402, the reading controller 204 reads the image data of the first buffer area 208a from top portion to bottom portion and from left line to right line. The writing controller 202 synchronously and horizontally writes the image data into the second buffer area 208n from left line to right line and from top portion to bottom portion. In one embodiment of stage 1 in FIG. 5, the reading controller 204 vertically reads the first physical address section "A" and the third physical address section "C" and the writing controller 202 synchronously and horizontally writes the image data into the fifth physical address section "E" and the sixth physical address section "F".

In an embodiment, a reading speed of the reading controller 204 to the buffer 208 is greater than a writing speed of the writing controller 202 to the buffer 208. In another embodiment, a reading speed of the reading controller 204 to the buffer 208 is the same as a writing speed of the writing controller 202 to the buffer 208. It should be noted that the reading step and the writing step of the method for processing image data sequentially access the image data on the basis of the addresses of the first buffer area 208a and the second first buffer area 208b of the buffer 208. For example, the vertically reading step means that the image data are read from top portion to bottom portion and from left line to right line and the horizontally writing step means that the image data are written into the buffer 208 from left line to right line and from top portion to bottom portion.

In the step S404, while the reading controller 204 completely reads a first portion of the first buffer area 208a, the state controller 212 allocates the complete read first portion of first buffer area 208a to second buffer area 208b to be served as a writing section. In one embodiment of the stage 1 in FIG. 5, while the image data in the first physical address section "A" and the third physical address section "C" are completely read, the first physical address section "A" and the third physical address section "C" of the first buffer area 208a are allocated into and follows the sixth physical address section "F" of the second buffer area 208b based on the address in order to be served as a writing section. The first physical address section "A" and the third physical address section "C" allocated into the first buffer area 208a are horizontal allocation status. After the first physical address section "A" and the third physical address section "C" are completely read, the storage capacity of the first physical address section "A" and the third physical address section "C" are allocated into the second buffer area 208b so that the capacity of the buffer 208 maintains constant to save the buffer volume while processing the image data.

Specifically, when the step S400 performs the writing step, the second buffer area 208a is composed of the first through fourth physical address sections "A-D" and the second buffer 208b is composed of the fifth and sixth physical address sections "E" and "F". After the step S402 completely writes the image data into the sixth physical address sections "F", the second buffer area 208b further includes the first and third physical address sections "A" and "C", which means that the second buffer area 208b is composed of physical address sections "E", "F", "A" and "C", meanwhile, the image data in the first and third physical address sections "A" and "C" have been read.

In the step S406, the reading controller 204 vertically reads the image data in a second portion of the first buffer area 208a and the writing controller 202 continuously writes the image data into the second buffer area 208b. In one embodiment of the stage 1 in FIG. 5, the image data in the second physical address section "B" and the fourth physical address section "D" are vertically read, and the image data are synchronously and horizontally written into the first physical address section "A" and the third physical address section "C" of the allocated second buffer area 208b of the step S404.

It should be noted that during the step S402 through the step S406, the first buffer area 208a is in reading status and the second buffer area 208b is in writing status. Further, the second buffer area 208b utilizes a portion of the completely read first buffer area 208a to be served as writing section so that the reading step of the image data in the first buffer area 208a and the writing step of the image data into the second buffer area 208b can be performed synchronously.

In the step S408, while the state controller 212 determines that the writing controller 202 completely writes the second buffer area 208b and after the state controller 212 determines that the reading controller 204 completely reads the second portion of the first buffer area 208a, the reading controller 204 continuously and vertically reads the image data of second buffer area 208b and the writing controller 202 horizontally writes the image data into first buffer area 208a. Further, after the reading controller 204 completely reads a portion of second buffer area 208b, the state controller 212 allocates the read portion of the second buffer area 208b to the first buffer area 208a to be served as a writing section.

In the step S410, the steps of S402 through S408 are repeated to complete the access of image data.

Specifically, the step S408 further includes the following steps, as shown in FIG. 4B.

In the step S408-1 of stage 2 in FIG. 5, while the state controller 212 determines that the writing controller 202 completely writes the image data into the first physical address section "A" and the third physical address section "C" and after the state controller 212 determines that the image data in the second physical address section "B" and the fourth physical address section "D" are completely read, the reading controller 204 vertically reads the image data in the fifth physical address section "E" and the first physical address section "A" of the second buffer area 208b, and the writing controller 202 synchronously and horizontally writes the image data into the fourth physical address section "D" and the second physical address section "B" of the first buffer area 208a.

In the step S408-2, while the image data in the fifth physical address section "E" and the first physical address section "A" are completely read, the fifth physical address section "E" and the first physical address section "A" are allocated into and follows the physical address section (e.g. second physical address section "B") of the first buffer area 208a based on the address in order to be served as the writing section.

In the step S408-3, the image data in the sixth physical address section "F" and the third physical address section "C" are vertically read, and the image data into the fifth physical address section "E" and the first physical address section "A" of the allocated first buffer area 208a of the step S408-2 are synchronously and horizontally written.

In the step S408-4 of stage 3 in FIG. 5, while the state controller 212 determines that the writing controller 202 completely writes the image data into the fifth physical address section "E" and the first physical address section "A" and after the state controller 212 determines that the image data in the sixth physical address section "F" and the third physical address section "C" are completely read, the reading controller 204 vertically reads the image data in the fourth physical address section "D" and the fifth physical address section "E" of the first buffer area 208a, and the writing controller 202 synchronously and horizontally writes the image data into the third physical address section "C" and the sixth physical address section "F" of the second buffer area 208b.

In the step S408-5, while the image data in the fourth physical address section "D" and the fifth physical address section "E" are completely read, the fourth physical address section "D" and the fifth physical address section "E" are allocated into and follows the physical address section (e.g. sixth physical address section "F") of the second buffer area 208b based on the address in order to be served as the writing section.

In the step S408-6, the image data in the second physical address section and the first physical address section are vertically read, and the image data synchronously and horizontally are written into the fourth physical address section "D" and the fifth physical address section "E" of the allocated second buffer area 208b of the step S408-5.

In the step S408-7 of stage 4 in FIG. 5, while the state controller 212 determines that the writing controller 202 completely writes the image data into the fourth physical address section "D" and the fifth physical address section "E" and after the state controller 212 determines that the reading controller 204 completely reads the image data in the second physical address section "B" and the first physical address section "A", the reading controller 204 vertically reads the image data in the third physical address section "C" and the fourth physical address section "D" of the second buffer area 208b, and the writing controller 202 synchronously and horizontally writes the image data into the first physical address section "A" and the second physical address section "B" of the second buffer area 208b.

In the step S408-8, while the image data in the third physical address section "C" and the fourth physical address section "D" are completely read, the third physical address section "C" and the fourth physical address section "D" are allocated into the physical address section (e.g. second physical address section "B") of the first buffer area 208a based on the address in order to be served as the writing section.

In the step S408-9, the image data in the sixth physical address section "F" and the fifth physical address section "E" are vertically read, and the image data into the third physical address section "C" and the fourth physical address section "D" of the allocated first buffer area 208a of the step S408-8 are synchronously and horizontally written, wherein while completely reading the image data in the sixth physical address section "F" and the fifth physical address section "E", the fifth physical address section "E" is allocated forward the sixth physical address section "F", wherein the allocation of the second buffer area 208b is the same with that in the step S400.

Figure 6:
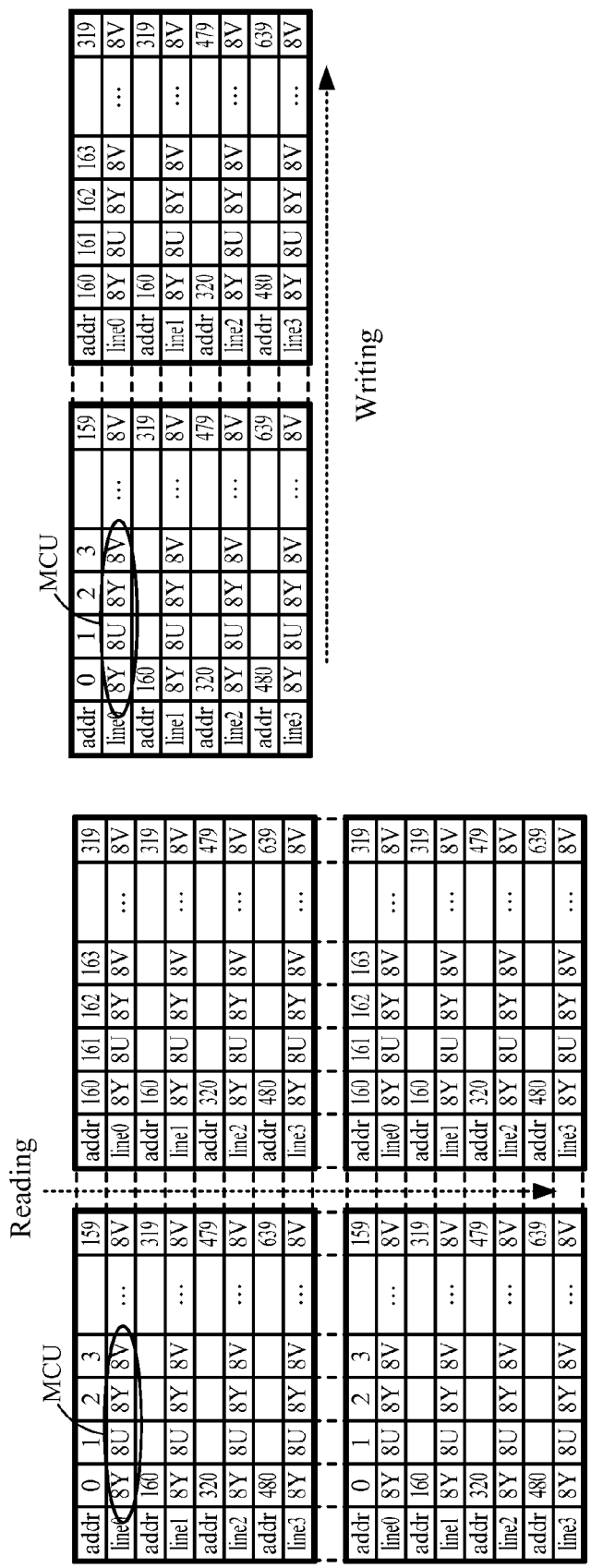
FIG. 6 is a schematic view of data structure of the buffer according to one embodiment of the present invention.

Please refer to FIG. 2 and FIG. 6. FIG. 6 is a schematic view of data structure of the buffer 208 according to one embodiment of the present invention. The buffer 208 includes a first buffer area 208a and a second buffer area 208b wherein the first buffer area 208a and second buffer area 208b respectively includes four physical address sections 201, each physical address section 201 is composed of four line buffer ("line 0" through "line 3" and "line 4" through "line 7"), each line buffer is composed of 320 addresses, each physical address section has 640 addresses ("addr 0" through "addr 639"). In one embodiment, a set of 32 addresses is defined as a minimum coded unit (abbreviated as MCU) which represents 32 bytes. The reading controller 204 read the image data from the buffer 208 and output the image data to the JPEG encoder 214 for compression.

When performing the writing step of image data, the image data stream are arranged an image component Y composed of two sets of 8 bytes, an image component U composed of a set of 8 bytes, and an image component V composed of a set of 8 bytes. Then, the arranged image data stream is stored from the first register 206 to the buffer 208 for the following reading step. When performing the reading step of the image data, the YUV image data having 32 bytes are read at the former four addresses of each MCU and then stored in the second register 210 wherein YUV image data includes an image component Y composed of two sets of 8 bytes (Y1, Y2), an image component U composed of a set of 8 bytes (U1), and an image component V composed of a set of 8 bytes (V1) to reduce the access amount of the buffer 208 for saving the power consumption of the image data processing apparatus 200.

According to the above-mentioned descriptions, the method for processing the image data by dividing the buffer into a first buffer area and a second buffer area for allocating a read portion of first buffer area to the second buffer area and follows the second buffer area to be served as a writing section in order to save the buffer processing capacity of the image data. Further, the method for processing the image data by dividing the buffer into a first buffer area and a second buffer area so that the reading step of the image data in the first buffer area and the writing step of the image data into the second buffer area can be performed synchronously when the reading speed of the buffer is greater than or equal to the writing speed of the buffer.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for processing image data adapted to an image data processing apparatus comprising a writing controller, a reading controller, a buffer and a state controller wherein the buffer comprises a first buffer area and a second buffer area, the method comprising the steps of:
   (a) horizontally writing the image data into the first buffer area by the writing controller until the first buffer area is fully written;
   (b) vertically reading the image data stored in the first buffer area by the reading controller and synchronously and horizontally writing the image data into the second buffer area by the writing controller;
   (c) while completely reading a first portion of the first buffer area by the reading controller, allocating the complete read the first portion of the first buffer area into the second buffer area by the state controller;
   (d) vertically reading the image data in a second portion of the first buffer area by the reading controller and writing the image data into the second buffer area by the writing controller;
   (e) while the state controller determines that the writing controller completely writes the second buffer area, vertically reading the image data of second buffer area by the reading controller and horizontally writing the image data into the first buffer area by the writing controller, and after completely reading a portion of the second buffer area by the reading controller, allocating the read portion of the second buffer area into the first buffer area by the state controller; and
   (f) repeating the steps of (a) through (e) to complete the access of the image data.

2. The method for processing image data of claim 1, before the step (a), further comprising the step of: (a1) allocating the first buffer area to generate a first physical address section, a second physical address section, a third physical address section and a fourth physical address section which form a matrix arrangement on the basis of an address order by the image data processing apparatus, and allocating the second buffer area to generate a fifth physical address section and a sixth physical address section which form a horizontal arrangement on the basis of the address order by the image data processing apparatus, wherein the first portion of the first buffer area comprises the first physical address section and the third physical address section, and the second portion of the first buffer area comprises the second physical address section and the fourth physical address section.

3. The method for processing image data of claim 2, wherein during the step (b), the reading controller vertically reads the first physical address section and the third physical address section and the writing controller synchronously and horizontally writes the image data into the fifth physical address section and the sixth physical address section.

4. The method for processing image data of claim 3, wherein during the step (c), while the image data in the first physical address section and the third physical address section are completely read, the first physical address section and the third physical address section of the first buffer area are allocated into the second buffer area and follows the sixth physical address section of the second buffer area based on the address to be served as a writing section.

5. The method for processing image data of claim 4, wherein during the step (d), the image data in the second physical address section and the fourth physical address section are vertically read, and the image data are synchronously and horizontally written into the first physical address section and the third physical address section which are allocated into the second buffer area in the step (c).

6. The method for processing image data of claim 5, wherein during the step (e), further comprising the steps of:
(f) while the state controller determines that the writing controller completely writes the image data into the first physical address section and the third physical address section, the reading controller vertically reads the image data in the fifth physical address section and the first physical address section of the second buffer area, and the writing controller synchronously and horizontally writes the image data into the fourth physical address section and the second physical address section of the first buffer area;
(g) while the image data in the fifth physical address section and the first physical address section are completely read, the fifth physical address section and the first physical address section are allocated into the first buffer area and follows the second physical address section of the first buffer area based on the address in order to be served as the writing section; and
(h) vertically reading the image data in the sixth physical address section and the third physical address section, and synchronously and horizontally writing the image data into the fifth physical address section and the first physical address section which are allocated into the first buffer area in the step (g).

7. The method for processing image data of claim 6, wherein after the step (h), further comprising the steps of:
(i) while the state controller determines that the writing controller completely writes the image data into the fifth physical address section and the first physical address section, the reading controller vertically reads the image data in the fourth physical address section and the fifth physical address section of the first buffer area, and the writing controller synchronously and horizontally writes the image data into the third physical address section and the sixth physical address section of the second buffer area;

(j) while the image data in the fourth physical address section and the fifth physical address section are completely read, the fourth physical address section and the fifth physical address section are allocated into the second buffer area and follows the sixth physical address section of the second buffer area based on the address in order to be served as the writing section; and
(k) vertically reading the image data in the second physical address section and the first physical address section, and synchronously and horizontally writing the image data into the fourth physical address section and the fifth physical address section which are allocated into the second buffer area in the step (j).

8. The method for processing image data of claim 7, wherein after the step (k), further comprising the steps of: (l) while the state controller determines that the writing controller completely writes the image data into the fourth physical address section and the fifth physical address section, the reading controller vertically reads the image data in the third physical address section and the fourth physical address section of the second buffer area, and the writing controller synchronously and horizontally writes the image data into the first physical address section and the second physical address section of the second buffer area; (m) while the image data in the third physical address section and the fourth physical address section are completely read, the third physical address section and the fourth physical address section are allocated into the first buffer area and follows the second physical address section of the first buffer area based on the address in order to be served as the writing section; and (n) vertically reading the image data in the sixth physical address section and the fifth physical address section, and synchronously and horizontally writing the image data into the third physical address section and the fourth physical address section which are allocated into the first buffer area in the step (m), wherein while completely reading the image data in the sixth physical address section and the fifth physical address section, the fifth physical address section is allocated forward the sixth physical address section, wherein the allocation of the second buffer area is the same with that in the step (a1), alternatively, the addresses in the third physical address section and the fourth physical address section allocated in the step (m) are the same as those in the third physical address section and the fourth physical address section allocated in the step (a1).

9. The method for processing image data of claim 2, wherein each of the capacities of the first through sixth physical address sections is equal.

10. The method for processing image data of claim 2, wherein a reading speed of the reading controller to the buffer is greater than a writing speed of the writing controller to the buffer.

11. The method for processing image data of claim 2, wherein a reading speed of the reading controller to the buffer is the same as a writing speed of the writing controller to the buffer.

* * * * *